United States Patent [19]

Oshima et al.

[11] Patent Number: 4,529,283

[45] Date of Patent: Jul. 16, 1985

[54] CAMERA WITH TURRET LENS AND VARIABLE FRAME VIEWFINDER

[75] Inventors: Shigeru Oshima, Toyko, Japan; Wan C. Wong, North Point, Hong Kong

[73] Assignee: W. Haking Enterprises, Limited, Hong Kong, Hong Kong

[21] Appl. No.: 522,452

[22] Filed: Aug. 10, 1983

[51] Int. Cl.³ ............................................. G03B 13/12
[52] U.S. Cl. ................................ 354/195.12; 354/121; 354/222; 354/268
[58] Field of Search ............... 354/121, 195.12, 199, 354/222, 224, 225, 221, 266, 268

[56] References Cited

U.S. PATENT DOCUMENTS

| | | | |
|---|---|---|---|
| 2,653,528 | 9/1953 | Mueller | 354/221 |
| 3,118,014 | 1/1964 | Winkler | 354/222 |
| 3,212,422 | 10/1965 | Nerwin et al. | 354/222 |
| 3,619,202 | 11/1971 | Bellows | 354/222 |
| 3,961,344 | 6/1976 | Baisch et al. | 354/222 |
| 4,104,663 | 8/1978 | Yamazaki et al. | 354/195.12 |
| 4,129,369 | 12/1978 | Kobayashi et al. | 354/195.12 |

FOREIGN PATENT DOCUMENTS

| | | |
|---|---|---|
| 2711125 | 9/1978 | Fed. Rep. of Germany ...... 354/222 |
| 520490 | 4/1940 | United Kingdom . |
| 571645 | 9/1945 | United Kingdom . |
| 707139 | 4/1954 | United Kingdom . |
| 725018 | 3/1955 | United Kingdom . |
| 850498 | 10/1960 | United Kingdom . |
| 856837 | 12/1960 | United Kingdom . |
| 867465 | 5/1961 | United Kingdom . |
| 886904 | 1/1962 | United Kingdom . |
| 1057586 | 2/1967 | United Kingdom . |

Primary Examiner—A. A. Mathews
Attorney, Agent, or Firm—Russell E. Hattis; Stephen R. Arnold

[57] ABSTRACT

A lens system for a disc camera features a plurality of objective lenses of different focal lengths carried on a turret support that can be rotated into different stable positions in front of the framing area of the film disc to bring a selective lens into picture-taking position. An associated viewfinder adjusting system ganged for operation with the turret support projects a different framing mark pattern into the field of view, the projected pattern corresponding to the image field produced by the objective lens currently in position. A shutter releases inhibitor bars actuation of the shutter release unless an objective lens is properly positioned for exposure.

11 Claims, 18 Drawing Figures

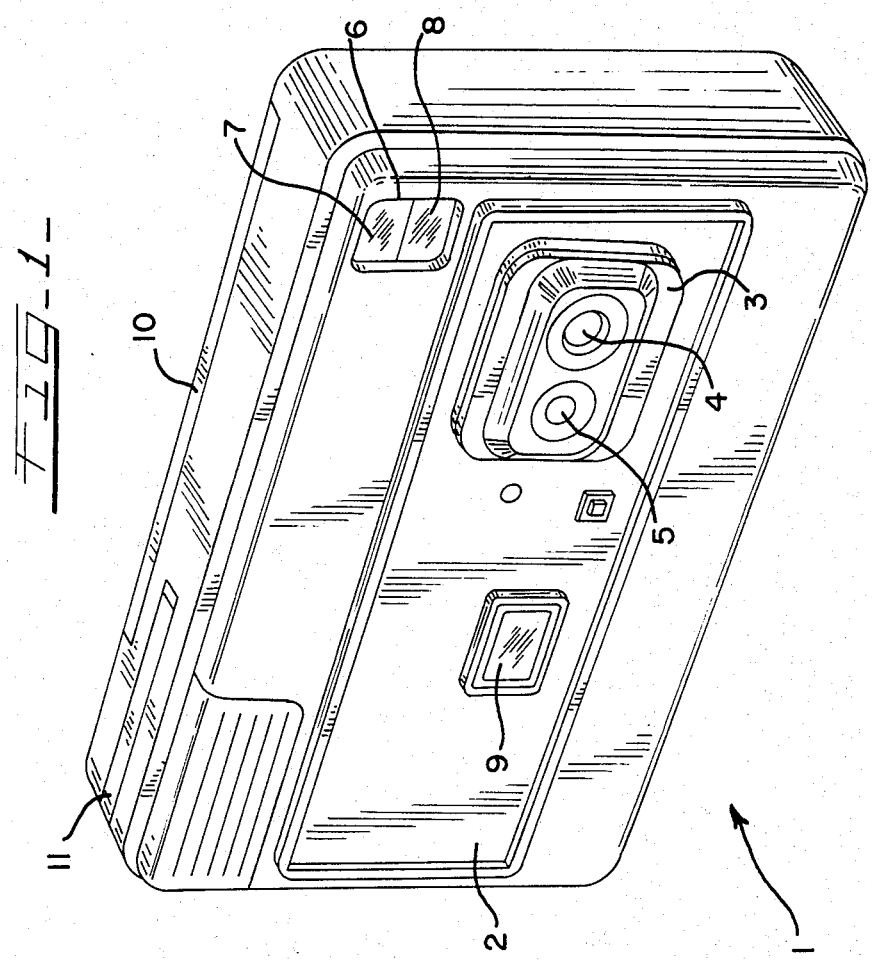

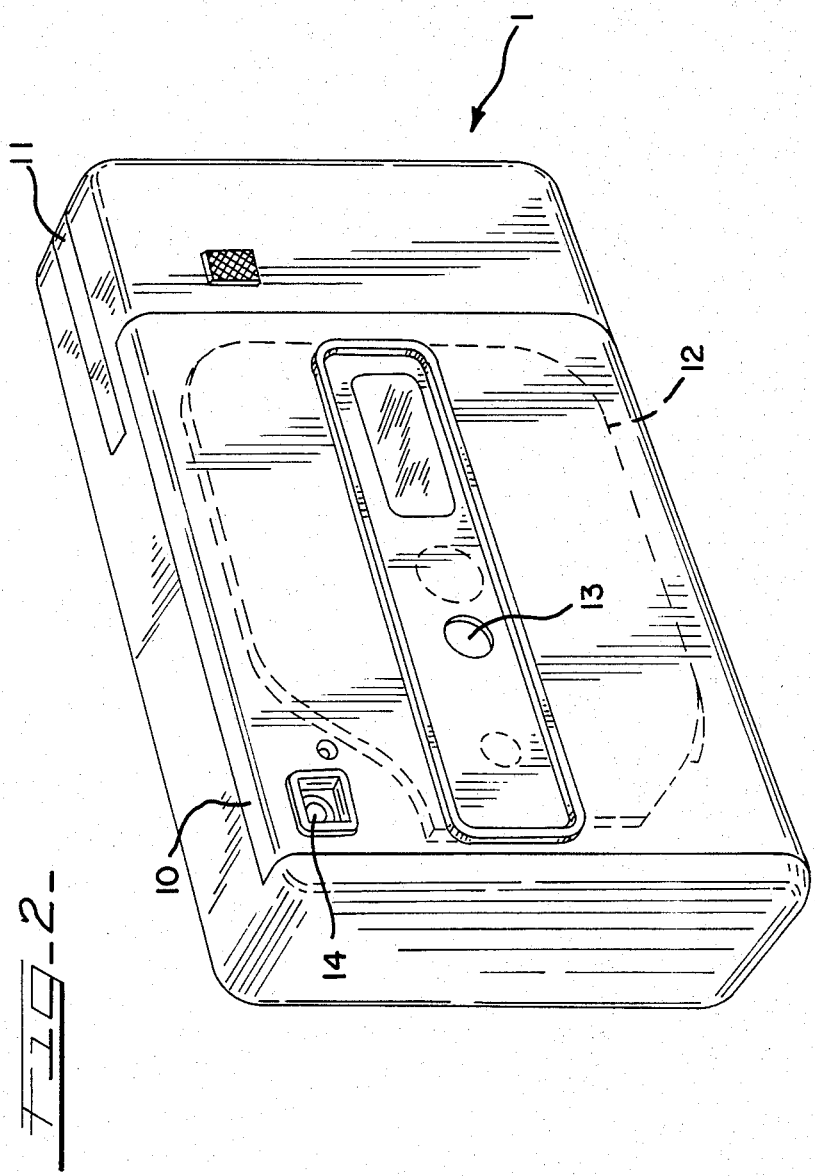

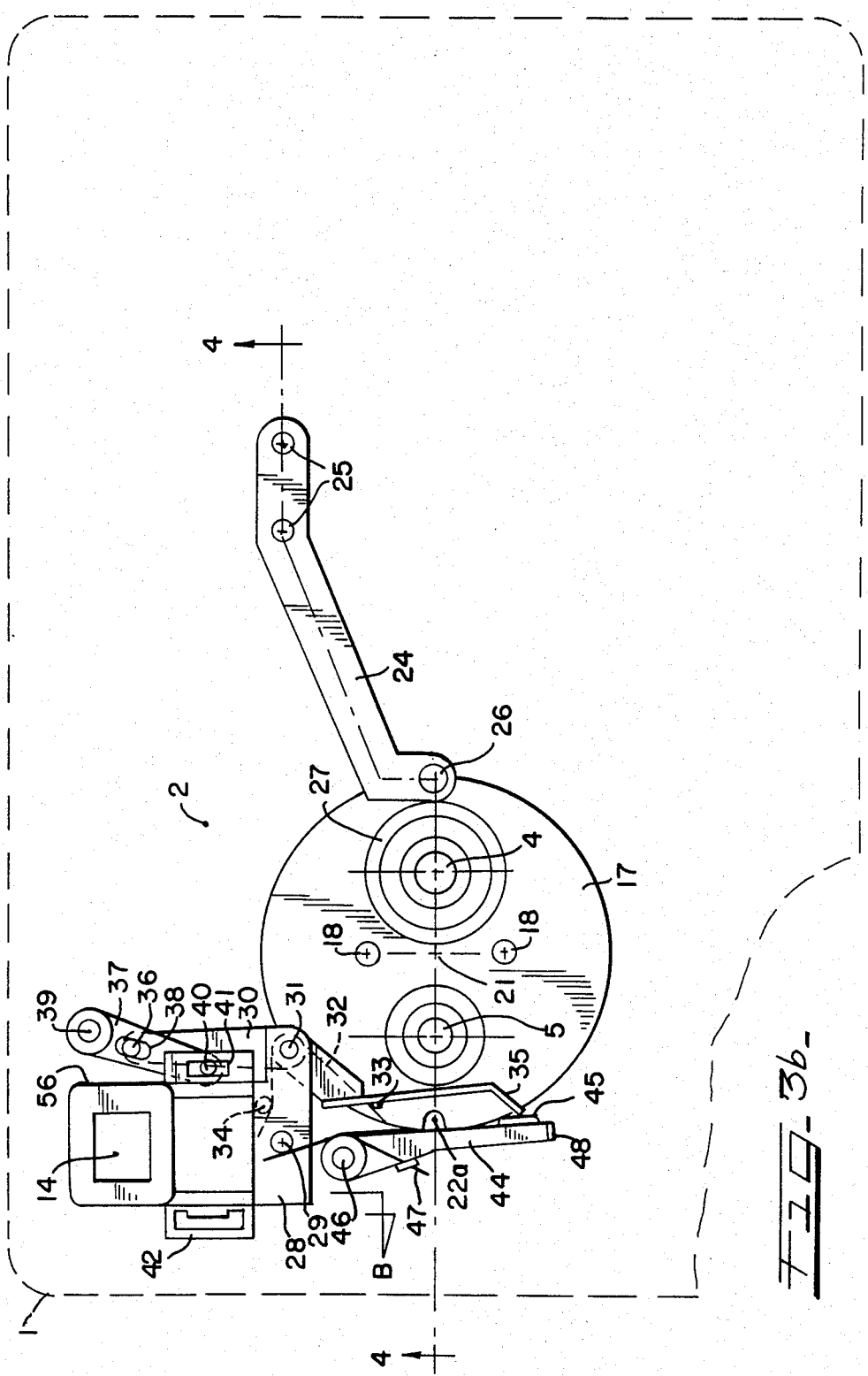

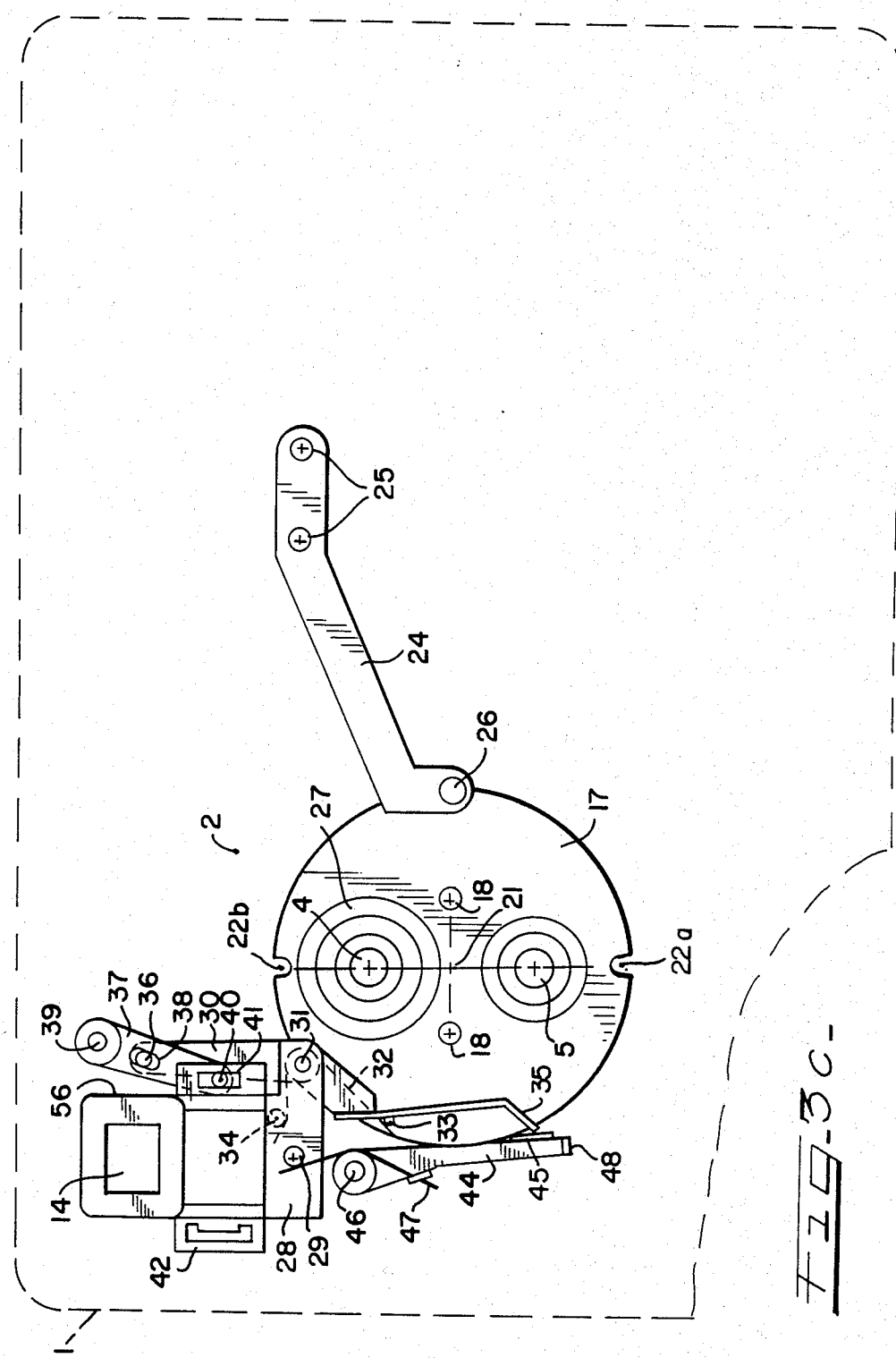

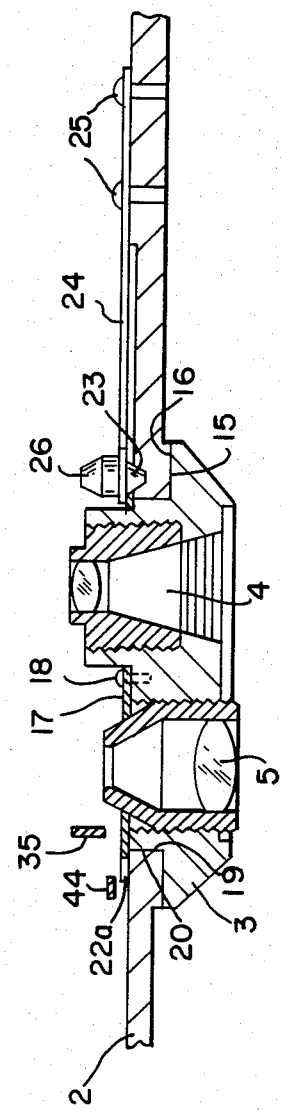

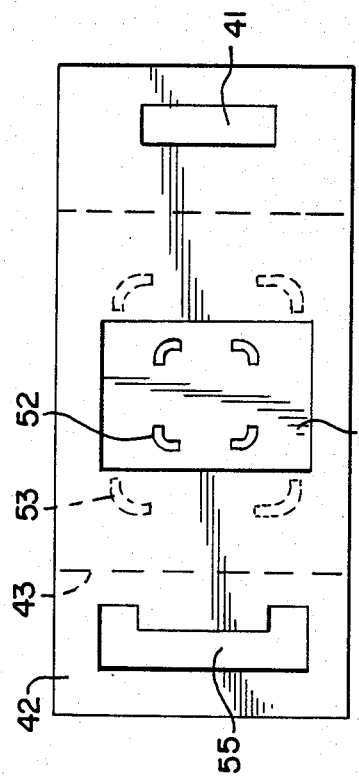
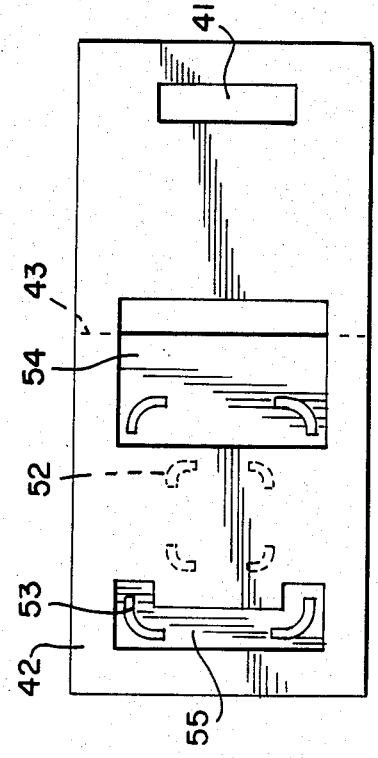
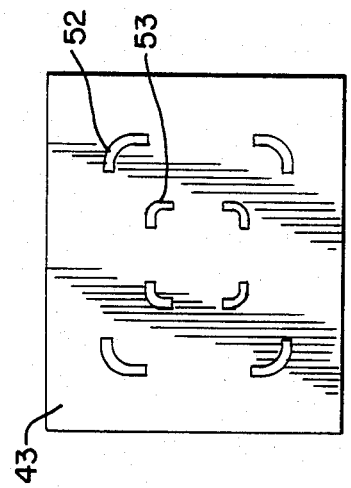
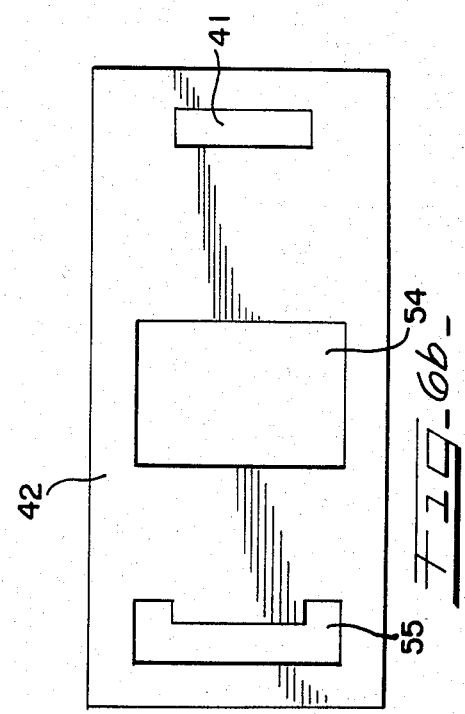

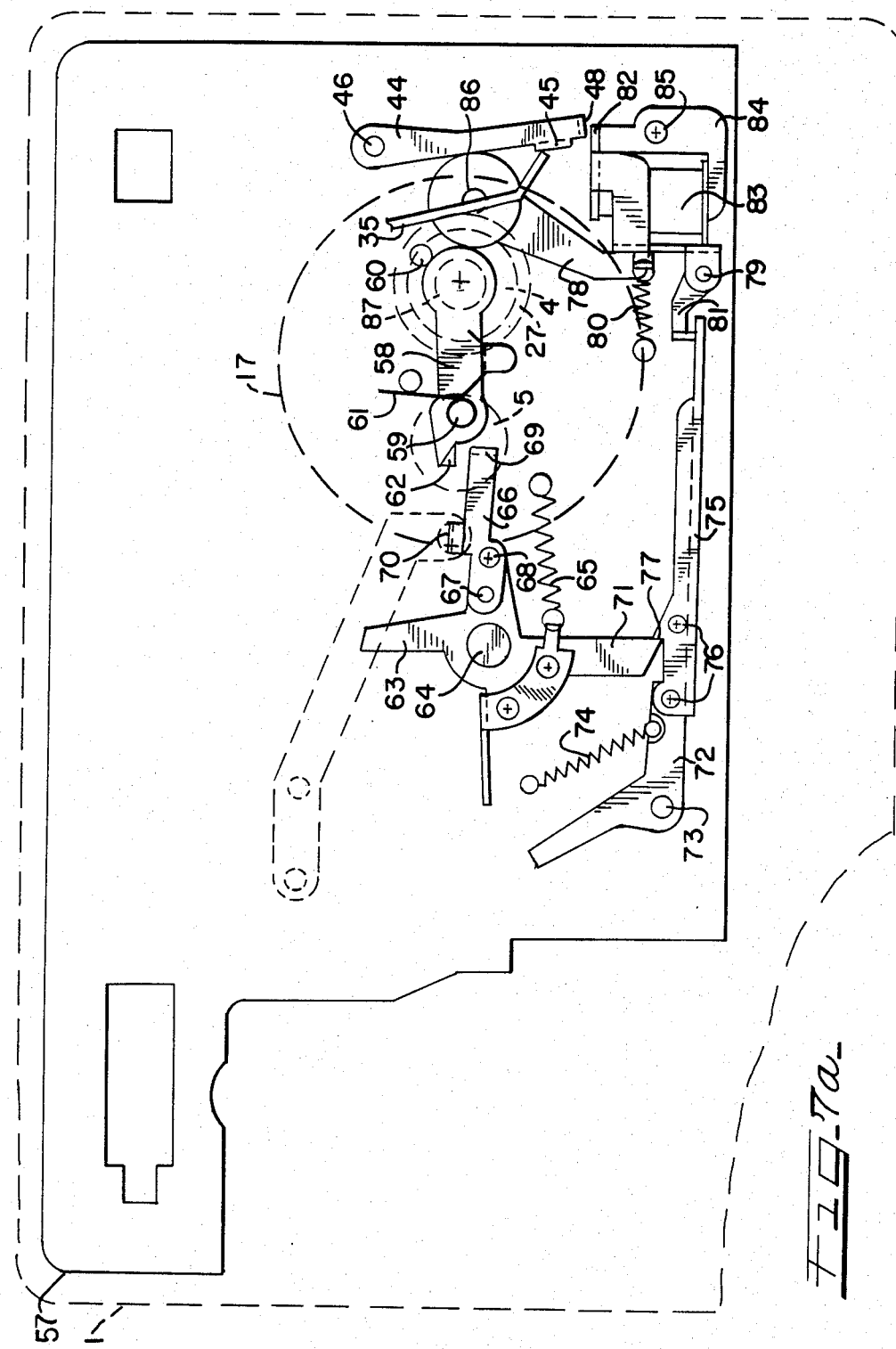

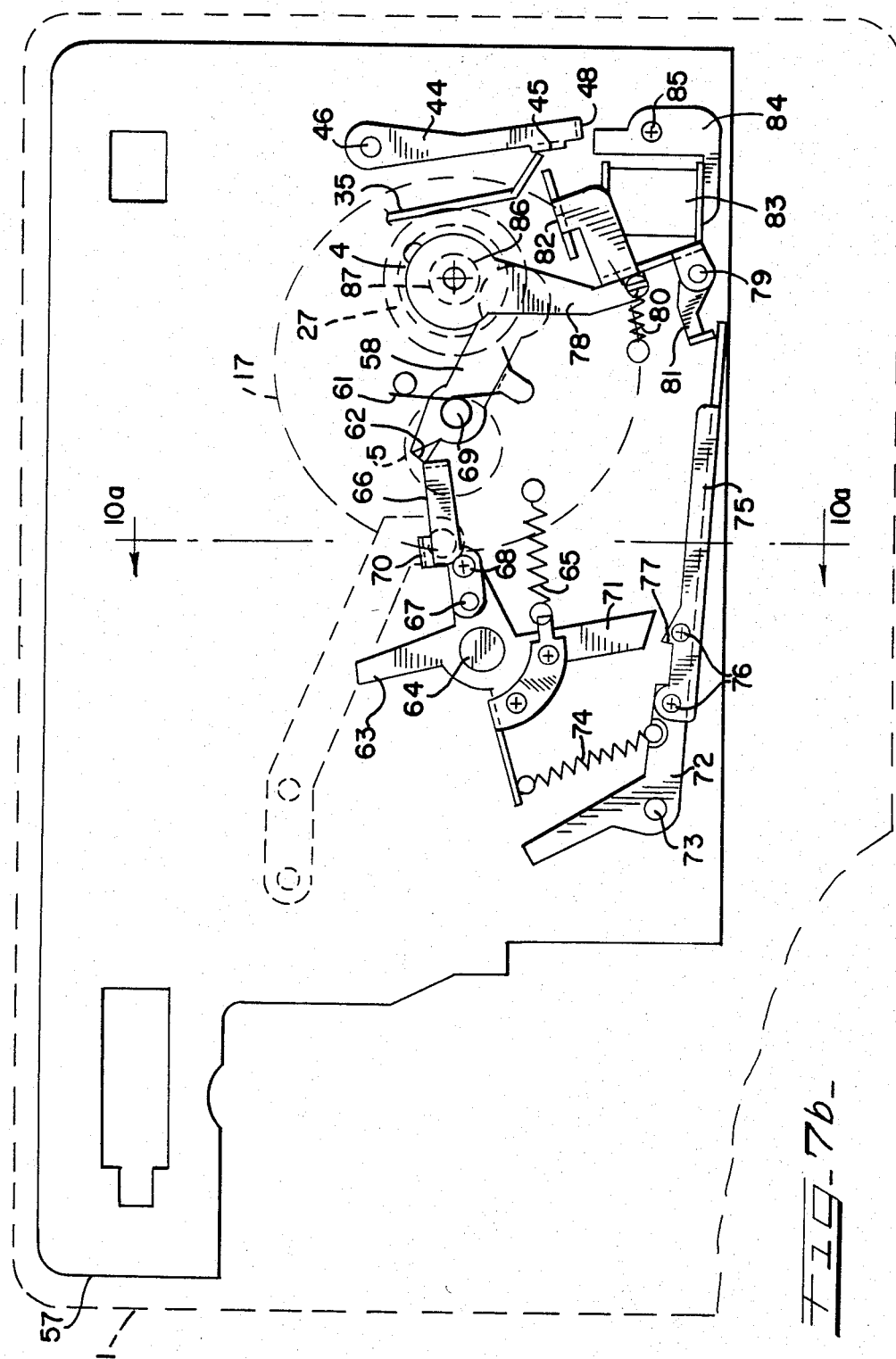

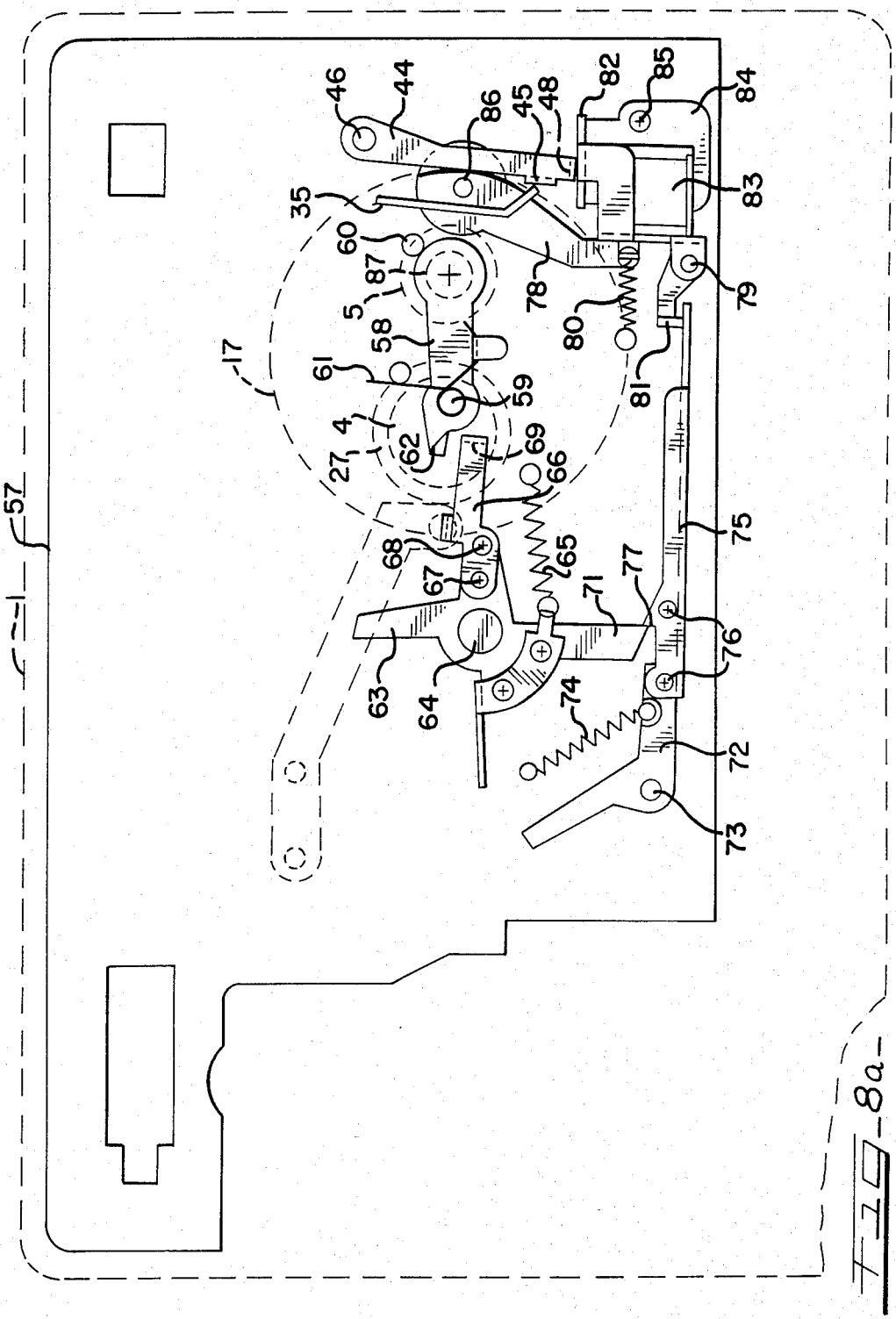

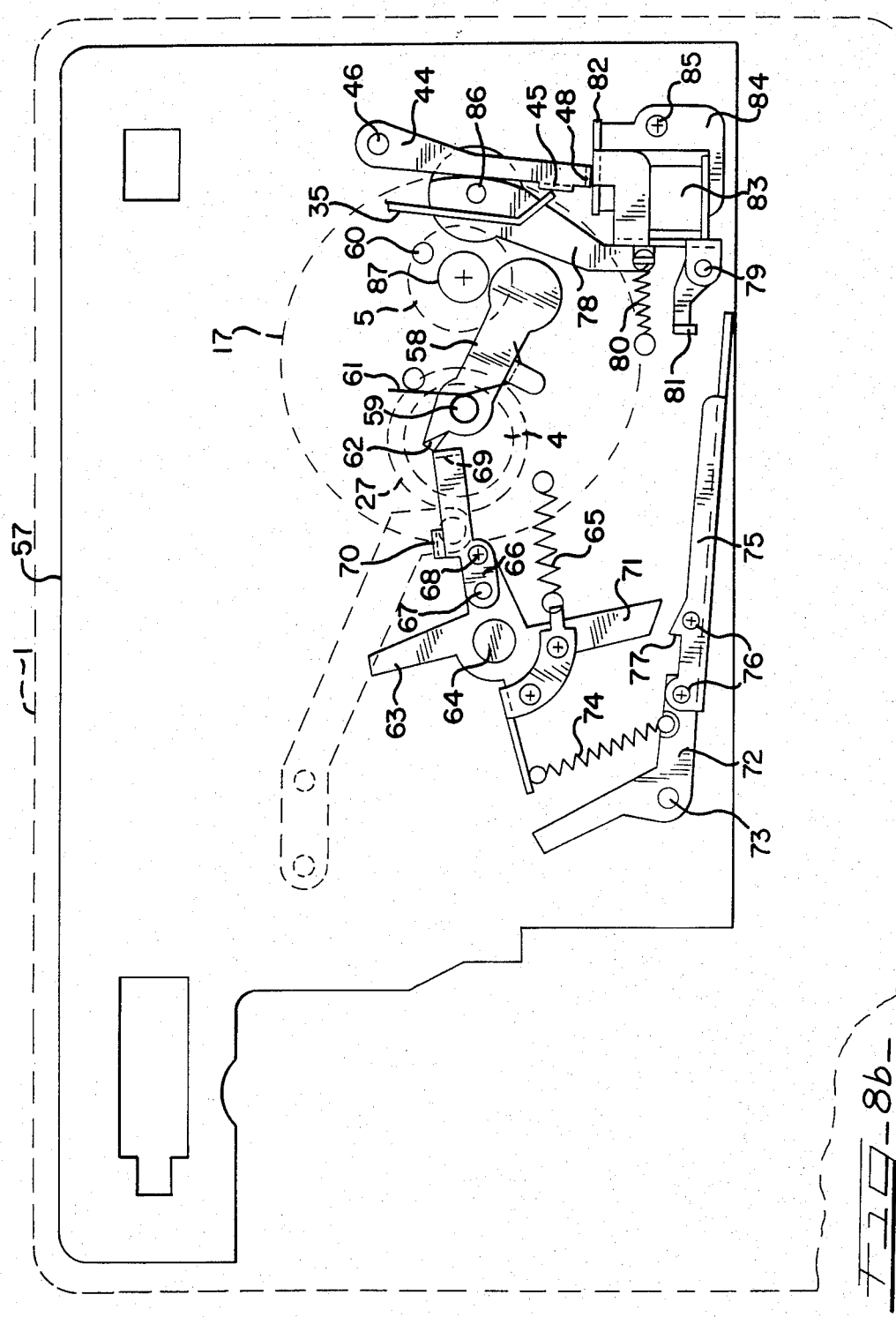

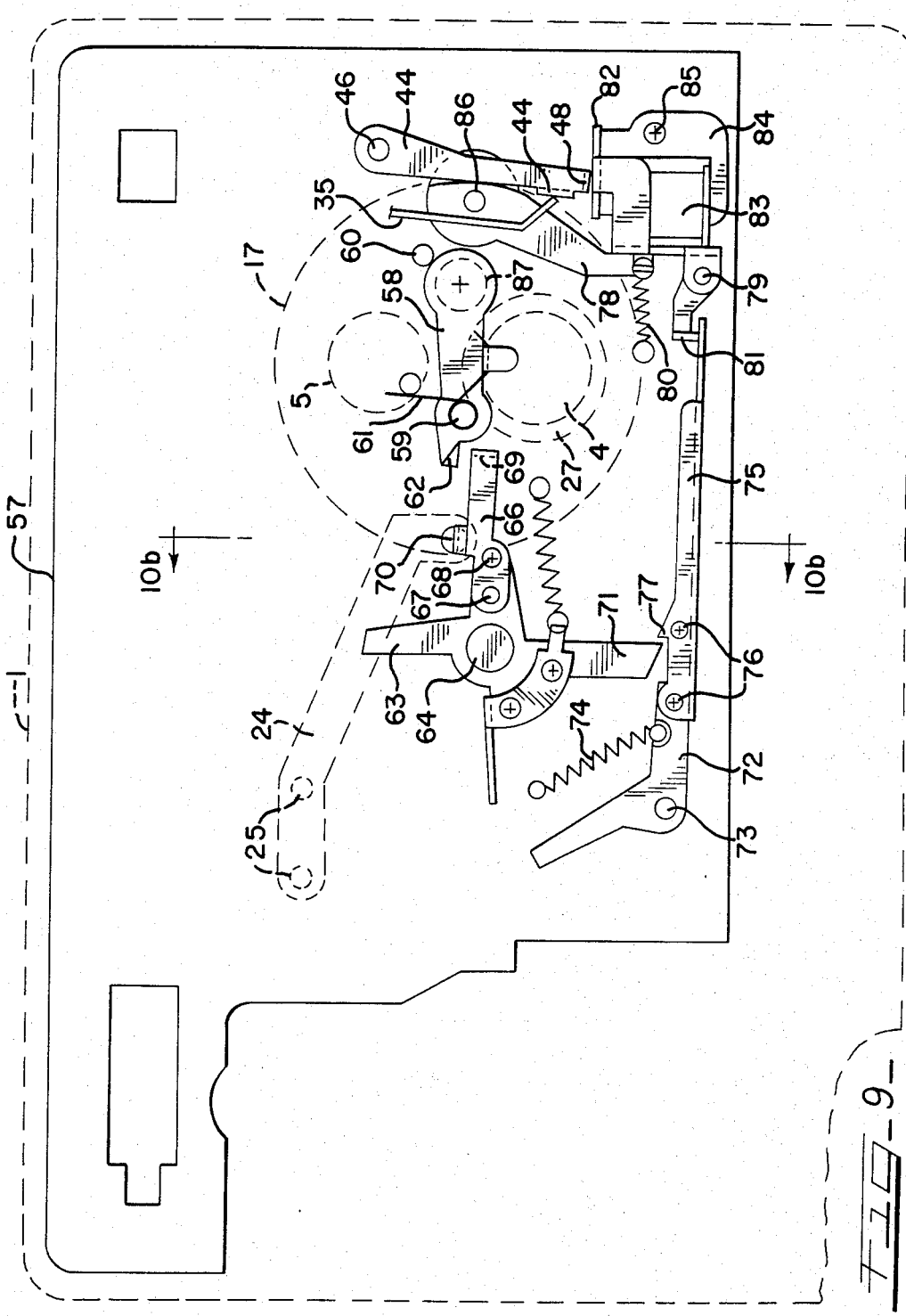

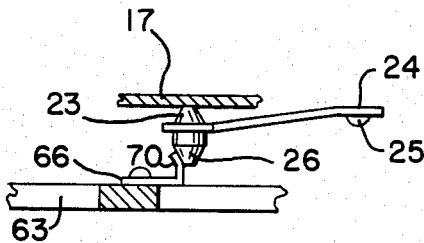
FIG_10b_
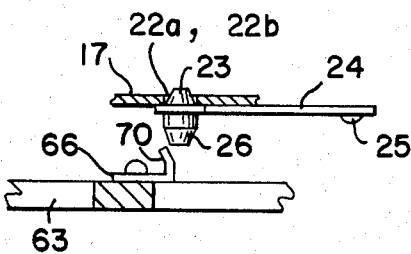
FIG_10a_

CAMERA WITH TURRET LENS AND VARIABLE FRAME VIEWFINDER

TECHNICAL FIELD OF THE INVENTION

The technical field of the invention is the camera art, and while some of the features of the invention are applicable to movie or still cameras, its most useful and important application is in still disc cameras.

BACKGROUND OF INVENTION

The market economics of disc cameras of the type currently on the market dictate the nature of allowable improvements in such cameras. Such cameras are designed for casual use, feature extreme simplicity of operation, and are further intended to provide a finished print of good quality in moderate sizes. The market is highly competitive, with the result that improvements in such cameras must be achieved under a total economy of cost. In particular, such cameras are designed to be unitary in nature i.e. separate accessories such as snap-on or screw in supplemental lenses, separate flash units, etc. are considered to be of dubious marketability; any such changeovers should be accomplished by means of simple mechanical operations carried out by a simple manual or sliding operation of a camera control, with the relevant accessories permanently mounted.

Thus, for example, it is considered desirable that there be provided, within the above mentioned cost limitations, an on-board switchover system to provide for varying the objective lens system between telephoto and relatively wide angle lenses. One proposed approach employed a supplemental lens mounted on a slider, the supplemental lens being slid over the normal objective or picture-taking lens to provide a factor of two increase in magnification. Because of the design constraints on the position and overall optical properties of the main objective lens, it is generally found that slight variations in the position of such a supplemental lens cause a noticeable degradation in image quality, this variation arising from variability of the standoff distance of this supplemental lens because of looseness of the track in which the associated lens mount slides. Moreover, because of basic system constraints, such supplemental lenses are commonly found to be a mediocre substitute for a well-designed unitary objective lens. A related problem is that of providing a viewfinder that will function properly, whichever lens system is in use.

A representative example of the state of the art with respect to disc camera objective lens changeover systems and associated viewfinder changeover systems is found in a conversion system manufactured by Zykkor Manufacturing Co. of Japan, which features a snap-on carrier unit which carries a snap-in supplemental objective lens and a simple opaque framing mask to fit over the viewfinder. Such a system clearly does not fulfill the requirement for a unitary camera.

One possible improvement frequently used in other forms of still cameras is to present continuously, as bright images, a pair of framing rectangles in the viewfinder, the camera operator adjusting the orientation of his camera to place the subject within the appropriate rectangle depending upon which particular lens is currently in use. A frequent source of error arises when the operator fails to note which lens is in place, and hence which set of framing marks should be employed.

Thus, assuming that a practical objective lens changeover system could be developed, there would still be a need for a simple automatically actuated viewfinder changeover system which would uniquely and unambiguously present the proper framing pattern to the operator according to which lens system is currently in position. The fact that the disc camera must be thin as well as inexpensive poses severe restrictions on the forms of systems that may be adopted for this purpose. Too complex a system is unsuitable for such cameras because of the cost-competitive nature of the inexpensive camera market. One approach customarily employed in still cameras, and ruled out by the cost-complexity problem, is that of using an extra viewfinder lens automatically moved into position, as shown, for example, in U.S. Pat. No. 2,653,528 issued to Mueller, which discloses a coupled viewfinder turret lens system slaved to rotation of a turret carrying the objective lenses for a motion picture camera. A similar approach applied to still cameras is disclosed in U.S. Pat. No. 4,104,663 issued to Yamazaki et. al., wherein a supplemental lens is interposed in the optical train of the viewfinder to vary the apparent field thereof.

A further alternative approach is disclosed in U.S. Pat. No. 3,619,202 issued to Bellows, which shows a system for moving boundary-defining vanes slaved to a cam on an objective lens of the zoom type, the vane position varying with the current focal length of setting of the objective. A related and somewhat simpler approach is disclosed in U.S. Pat. No. 3,212,422 issued to Nerwin et. al., showing an extensible set of interlinked springs configured in the form of a rectangle and placed in the field of view, the springs being stretched by strings generally outward from the corners of the rectangle formed therebetween, the strings being slaved to rotation of the barrel of a zoom lens so as to stretch or alternatively relax the size of the rectangular frame so defined. Both of the foregoing examples are quite complex, and if applied to disc cameras would render them prohibitively expensive.

Thus, prior to the present invention, to the applicant's knowledge there has not been provided a simple, inexpensive on-board objective lens changeover system of adequate quality having an associated means for providing a simple viewfinder framing system which automatically adjusts the viewfinder to present the user with an unambiguous field-defining set of framing boundaries for any camera, let alone one which is especially suited for disc cameras.

SUMMARY OF INVENTION

According to a feature of the invention, a viewfinder particularly suitable for use in disc cameras in which compactness is an important requirement, includes means for providing a plurality of images in the form of lines defining concentric framing rectangles superimposed upon the viewed scene within the field of view of the viewfinder. Mechanically actuated means, ganged for operation preferably with a rotatable turret lens support, are provided to suppress the undesired framing marks from the field of view, so that the operator is unambiguously presented with only the framing lines indicative of the objective lens currently in place. A turret lens support is especially useful because it is easier to maintain close tolerances and consistent and accurate position of the lens elements carried thereby, as compared to a slide support system.

In the preferred embodiment of the invention there are two objective lenses carried by the turret support, providing a picture quality not readily obtainable using a supplemental lens mounted in alignment with another lens.

The turret construction lends itself uniquely to the disc camera environment for two reasons. First, because of the geometry of the disc film cassette, a substantial area of the front of the camera is underutilized and is capable of accommodating such a system without interfering with the placement of other components mounted on the front surface. This is to be contrasted with the typical geometry of, for example, motion picture cameras, wherein lens turrets are mounted on narrow edges thereof, and must of necessity protrude markedly on either side. Second, the interior front walls of disc cameras are usually similarly free of encumbrance, such components as shutter systems, film drive systems, etc., being normally mounted on the inside of the rear wall of the housing or on an interior motorboard. Thus, interior wall space that is underutilized may be employed to accommodate the lens turret bearing and any associated viewfinder coupling means associated therewith.

It is believed to be broadly unique to combine in a disc camera a turret-mounted group of objective lenses with a variable framing field viewfinder responsively coupled to the turret so as to present automatically to the user a representation of the scene angle corresponding to the lens currently in position. Thus, this broad aspect is a further feature of the invention.

According to a specific feature of the invention, the total viewing angle of the viewfinder remains constant, and the two framing rectangles are formed as a series of dashed boundary-defining bright line images, the elements of the outer and inner rectangles being offset with respect to each other, the rectangles being defined by a specially configured graticule back-illuminated by ambient light. A movable slide member, preferably configured with a series of apertures complementary to the the dashed-line elements of the two rectangles, is mounted for movement across the graticule, and has the property that at one limit of slide travel the elements of one framing rectangle are blocked from view, whereas the elements of the other are unblocked, so that the image of only one rectangle is presented in the viewfinder field. Movement of the slide to the extreme opposite position causes the elements comprising the second rectangle to be exposed and those of the first rectangle to be blocked, thereby presenting only the second rectangle in the field of view. Thus, by movement of the specially configured perforated slide, either the image of one field-defining rectangle or the other is selectively suppressed from view as seen in the viewfinder. Movement of the slide is derived from movement of the lens mounting-system to its two stable positions, causing a selected objective lens to be interposed on the imaging axis of the camera.

One prior art system, not involving portable cameras, and which has only a remote resemblance to the invention just described is disclosed in U.S. Pat. No. 3,633,482 issued to Tsuda. This patent discloses a microscope photographic system for rotating a plurality of framing corner-defining lines disposed on a transparent slide and viewed through an opaque mask having a central rectangular aperture therein. By rotation of the slide carrying the corners marks thereon, a series of different corner markings corresponding to different film sizes may be rotated into the field of view; however, because of the inherent geometrical limitations of such a system, only rectangular boundaries of slightly varying size may be accommodated by such a system, as contrasted with the present necessity for producing at least a two-to-one ratio change corresponding to normal disc camera objective lens choices. Moreover, as may readily be deduced by inspection of the above mentioned reference, the various corner elements of the undesired rectangles are imperfectly masked, portions of them remaining visible in the field of view at all times.

According to a specific feature of the invention, a shutter release inhibiting means is coupled to the turret lens mounting means to prevent tripping of the shutter unless one of the two lenses is properly positioned for exposure.

Other advantages and features of the invention will become apparent upon making reference to the description to follow, the drawings, and the claims.

DESCRIPTION OF DRAWINGS

FIG. 1 is a front perspective view of the camera of the present invention.

FIG. 2 is a rear perspective view of the camera showing a loaded disc film cartridge in dotted outline.

FIGS. 3a, 3b, and 3c are internal face views of the camera front cover showing the viewfinder mechanism when the objective lenses are positioned in normal mode, telephoto mode, and mid-way between, respectively.

FIG. 4 is a cross section view through FIG. 3b.

FIG. 6a is a front elevational view of a reticle mask.

FIG. 6b is a plan view of a slidable mask.

FIGS. 6c and 6d show the relative positions of both masks in normal mode and in telephoto respectively.

FIGS. 7a and 7b are plan views of a shutter and aperture mechanism in normal mode when the shutter is cocked and when it is just released respectively.

FIGS. 8a and 8b are plan views of the shutter and aperture mechanism of FIGS. 7a and 7b in telephoto mode when the shutter is cocked and when the shutter is just being released.

FIG. 9 is a plan view of the shutter and aperture mechanism of FIGS. 7 and 8 when the lens mode is being switched.

FIGS. 10a and 10b are cross section side views of a shutter release inhibitor in normal and telephoto mode respectively.

DESCRIPTION OF INVENTION

Figure 3A:
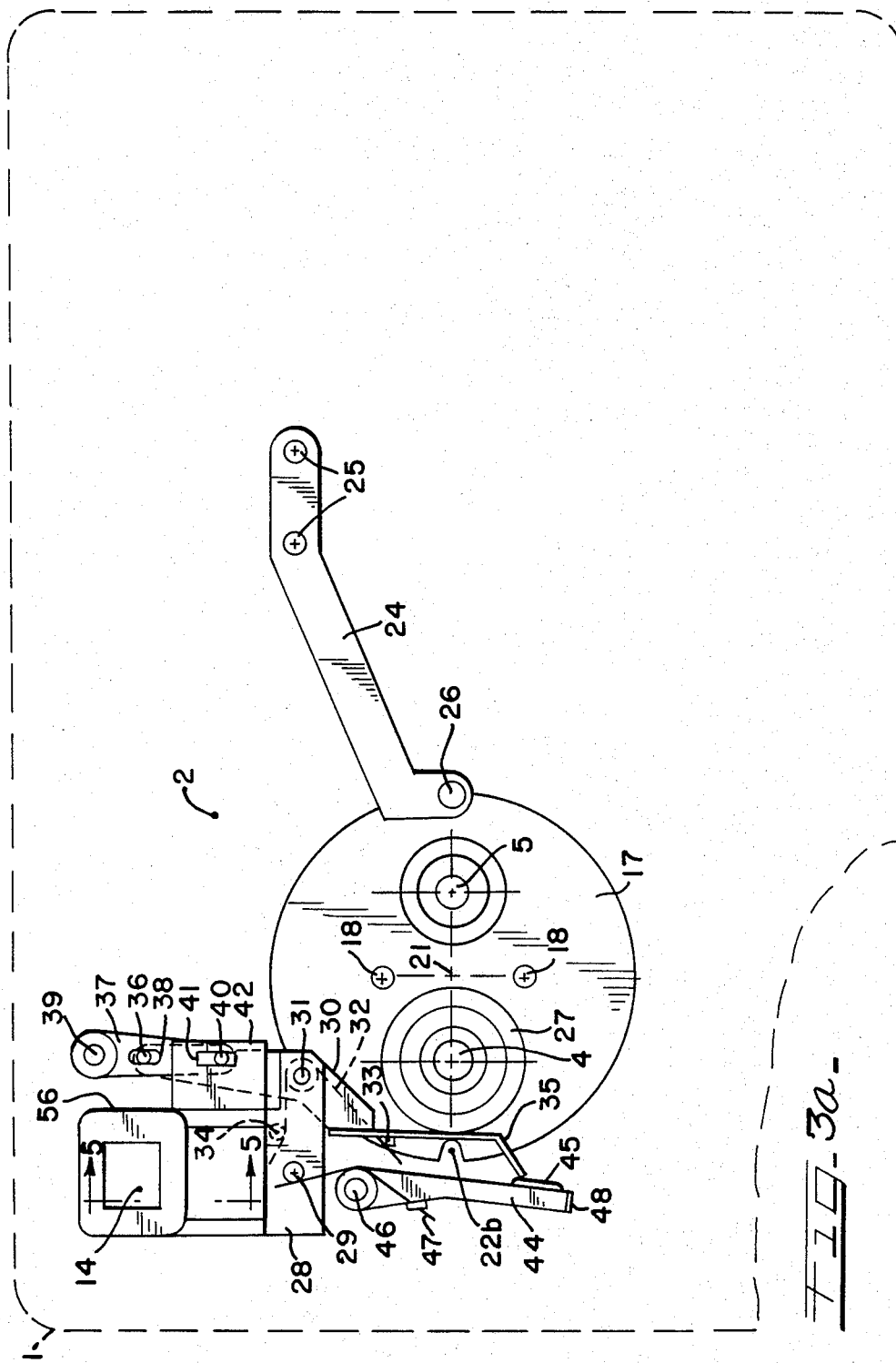

FIG. 1 shows a front pictorial view of a still camera 1 of the present invention. The camera is preferably a disc camera which contains two interchangeable picture-taking (objective) lenses disposed on a front cover 2 and near to the right-hand edge of the camera. Both lenses, normal 4 and telephoto 5, are mounted on the same lens holder or turret 3 which is rotatable about an axis mid-way between the optical axis of the two lenses. FIG. 1 shows the normal lens 4 exactly in the optical path of the camera 1 and in position for picture taking. The telephoto lens 5 is not in the optical path of the camera 1, and hence is not in position for picture taking. In the top right-hand corner a viewfinder 6 is disposed which comprises a window dividing into two halves. The upper half is a conventional viewfinder objective lens 7. The lower half is a reticle window 8. A viewfinder image of the scene or subject to be photographed is obtained by light entering the objective lens. Light is also let in through the reticle window 8 such that a virtual image of a reticle is projected into the viewfinder field and exhibit no parallax with respect to the viewfinder image. The reticle encloses that area of the subject which will become the picture. Details of the viewfinder will be described subsequently.

The front cover 2 also contains a shutter release button 9 which is disposed generally centrally thereon. A film-chamber door 10 (See FIG. 2) is in the back of the camera 1, and a latching lever 11 for latching the film-chamber door 10 is disposed in the top left-hand corner. A disc film cartridge 12 is also shown in dotted contours which has been loaded in the film chamber of the camera. A window 13 allows the camera user to observe the number of the fresh frame which has just been transported into the imaging position for picture taking. In the top left-hand corner a viewfinder eyepiece 14 is disposed. By looking through this eyepiece 14 the camera user may view the subject and also the reticle so that he knows exactly how much of the scene will be included in the picture.

FIGS. 3a to 3c show internal face views of the front cover 2 under the conditions when the normal lens is in use (i.e. in normal mode), when the telephoto lens is in use (i.e. in telephoto mode), and when the lenses are disposed mid-way therebetween, respectively. Only those part relating to the viewfinder 6 and the turret 3 are shown; others are omitted for the sake of clarity. FIG. 4 shows a section of FIG. 3b along a line containing the turret axis and the optical axis of the two lenses with the telephoto lens in position for use.

As shown in FIG. 4, the turret 3 has an angular bearing surface 15 which is held in bearing contact with a flange face 16 in the front cover 2 by means of a holding plate 17. The holding plate 17 is fastened to the turret 3 by means of two screws 18. A cylindrical surface 19 on the turret 3 is also in bearing contact with the internal wall of a hole 20 on the front cover 2 such that the turret 3 is in fact rotatable about an axis 21 which is also the center of the hole 20.

The two lenses, normal lens 4 and telephoto lens 5, are disposed exactly 180° apart from each other about the axis 21 and are equidistant therefrom. The holding plate 17 has two U-notches 22a and 22b, either of which is engageable with a locator pin 23 mounted on one end of a locator 24. The latter is fastened on the internal face of the front cover 2 by means of two screws 25. On the opposite side of the locator 24 where the locator pin 23 is mounted, a shutter release inhibitor 26 is mounted. Its function will be described subsequently.

On the back face of the turret 3 and where the normal lens 4 is mounted, there is a collar part 27. An external cylindrical surface of this collar part 27 actuates to change a reticle observable in the viewfinder and to actuate other mechanisms, which will also be described subsequently.

FIGS. 3a to 3c also show a viewfinder housing 28 which is fastened on the back face of the front cover 2 by means of a screw 29 and some locating edges (not shown). A first lever 30 is pivoted by an axle 31 which is mounted on an extension part of the viewfinder housing 28. The first lever 30 is always biased in the anti-clockwise direction by actuation on a lug 33 by a torsion spring 32. The other end of the spring 32 is held by a boss 34 integral with the viewfinder housing 28. The first lever 30 further has an actuation arm 35 and a control pin 36 on opposite sides of the pivot 31. The control pin 36 is in engagement with a slot 38 of a second lever 37, which is pivoted by an axle 39 mounted on the back face of the front cover 2. The second lever 37, in turn, has a control pin 40 in engagement with a rectangular slot 41 of a slidable mask 42. The slidable mask 42 is guided internally by the viewfinder housing 28 such that the mask 42 is laterally slidable inside the viewfinder housing. Therefore, a rotation of the first lever 30 brings the second lever 31 also into rotation, and the slidable mask 42 in lateral translation. The function of the mask 42 will be described later.

FIGS. 3a to 3c further show an aperture-control member 44 pivoted by an axle 46 mounted on the back face of the front cover 2. The aperture-control member 44 has a side-bend 45 and a lug part 48, and is biased anti-clockwise by a torsion spring 47. Thus, the side-bend 45 is always in abutment with the end of the actuation arm 35 of the first lever 30. The function of the aperture-control member 44 and its lug part 48 will be described later.

FIG. 3a shows the camera 1 in its normal mode having the normal lens 4 in the optical path (imaging path) of the camera. This picture-taking position of the turret 3 is defined by the engagement of the locator pin 23 with the U-notch 22a. The collar part 27 presses the actuation arm 35 of the first lever 30 against the bias of the torsion spring 32. Thus, the first lever 30, and in turn the second lever 37 and the slidable mask 42 are actuated to one end-position defined by the abutment of the actuation arm 35 with the collar part 27. Under such conditions, the slidable mask 42, as will be described later, hides portions of the projected reticle corresponding to the telephoto mode from the viewfinder field. That is, only that portion of the reticle used for the normal mode is visible inside the viewfinder 6 to correspond to the scene angle of the normal lens 4.

Figure 5:
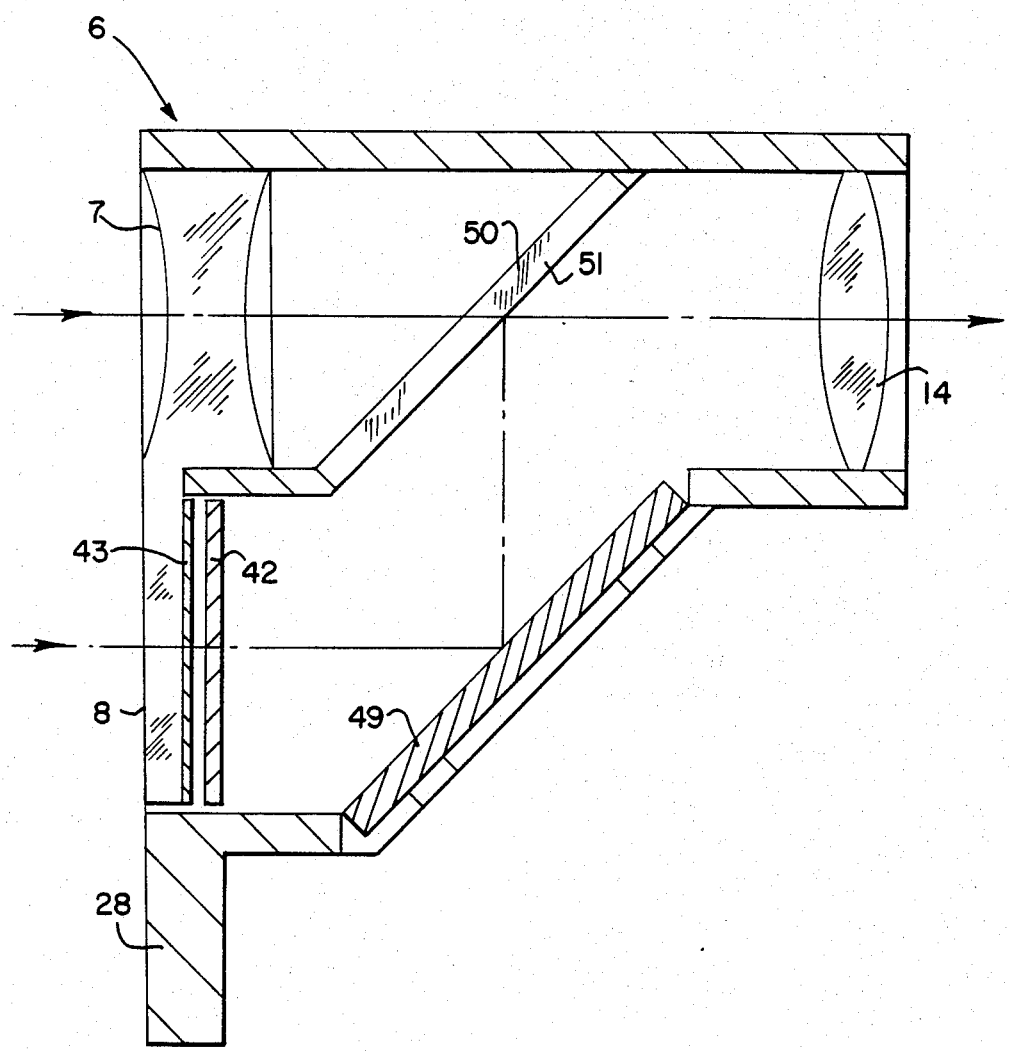
FIG. 5 is another cross section view of FIG. 3a, showing a viewfinder system.

FIG. 5 shows a section of the viewfinder 6. In the present invention, the viewfinder is preferably a projected-reticle system employing a system of dual optical paths. The first optical path is defined by the objective lens 7 and the eyepiece 14, from which the subject to be photographed is brought to a virtual image (usually of reduced magnification) and visible to the camera user when viewed through the eyepiece 14. The reticle window 8 and the objective lens 7 are preferably an integral part molded from an optical plastic material. The second optical path is defined by the reticle window 8, a reticle mask 43, the slidable mask 42, a reflecting mirror 49, a partially reflecting beam splitter 50, and finally the eyepiece 14. FIG. 6a shows a face view of the reticle mask 43, which is preferably made of a thin metal plate and has two sets of field-corner-defining frame openings 52 and 53. Light coming in from the reticle window 8 is obstructed by the reticle mask 43 but is let in through both frame openings 52 and 53. As a result, images of the frame openings 52 and 53 are projected by the reflecting mirror 49 and then by the semi-reflecting surface 51 of the beam-splitter 50 to appear as virtual images from behind the eyepiece 14 in the form of two reticles. By suitable combination of powers of the objective lens 7 and the eyepiece 14 and also proper choice of locations of the reticle mask 43, the mirror 49 and beam-splitter 50, the reticle images are projected virtually parallax-free with respect to the viewfinder image of the picture subject. The sizes of the frame openings 52 and 53 are so chosen such that the projected reticle images define the fields of view for picture-taking in normal and telephoto mode respectively. In practice, the field of view in the viewfinder is usually taken slightly less than the field of the actual picture. If both reticles are visible to the camera user at all times, confusion in use may occur.

One of the central features of the present invention is that only one reticle is visible, namely that reticle corresponding to the objective lens currently in position. When the lenses are switched over, the other reticle will automatically appear and the original reticle will automatically disappear. Consequently, the camera user will always know automatically the exact size of the subject which will be present in the final picture.

To accomplish this, the slidable mask 42 functions to reveal only one reticle and hide the other when the corresponding picture taking lens is in the optical path of the camera. The slidable mask 42, as shown in FIG. 6b, is a rectangular thin plate having a rectangular slot 41, a rectangular opening 54 and a U-shaped opening 55. The slidable mask 42 is laterally slidable parallel to its long dimension inside the viewfinder housing 28 (FIG. 5). When the slidable mask 42 is actuated to the position as shown in FIG. 3a, its relation with the reticle mask 43 is as shown in FIG. 6c. Under such circumstances, only the larger frame opening 52, which is the frame opening for normal mode, is revealed by both the rectangular opening 54 and the U-shaped opening 55. The smaller frame opening 53, which is used for telephoto mode, is hidden by the body of the slidable mask 42. Hence, the viewfinder 6 is arranged correctly for picture-taking in normal mode because only the larger reticle is projected inside the viewfinder view.

FIG. 3b shows the turret 3 rotated exactly 180° from its angular position as shown in FIG. 3a. The telephoto lens 5 is now in the imaging path of the camera 1. The locator pin 23 now engages with the U-notch 22b. Since the collar part 27 has been rotated away from the actuation arm 35 of the first lever 30, the first lever 30, the second lever 37 and the slidable mask 42 are urged to the other end-position by the torsion spring 32. This other end-position is defined by the abutment of the free end of the second lever 37 with a side wall 56 of the viewfinder housing 28. Under such circumstances, the relative positions of the slidable mask 42 and the reticle mask 43 are as shown in FIG. 6d. The smaller frame opening 53 is revealed by the rectangular opening 54, while the larger frame opening 52 is hidden by the body of the slidable mask 42. Hence, only the image of the smaller reticle is projected into the viewfinder field. Thus, the viewfinder 6 has automatically been changed to the correct arrangement for picture taking in telephoto mode.

It will be evident that the selective graticule masking system just described may be readily reconfigured to accommodate additional framing rectangle patterns, as would be necessary if additional objective lenses were to be added to the system. Moreover, it is also evident from FIGS. 3a and 3b that only a very short actuation stroke is necessary for graticule changeover in the two-lens system described, resulting in an economy of space utilization in the crowded interior of a disc camera.

It will further be recognized that there is complete suppression of the image of the unused graticule pattern, even for substantially different framing pattern sizes, a feature not present in the Tsuda system mentioned in the Summary of Invention.

Moreover, by slaving such a graticule-changing system to a turret lens system, automatic graticule changeover is combined with the optimal characteristics of completely separate on-board objective lenses, thereby maintaining a requisite picture quality not hitherto attainable using supplemental lenses mounted on a slide. Two desired functions have thus been combined.

FIG. 3c shows the turret 3 switched midway, having neither lens in the picture-taking position. The arrangement of the viewfinder mechanism, including the first lever 30, the second lever 37, and the slidable mask 42, is of no significance here, because the shutter release system is inhibited, as will be described later. The locator pin 23 is not in engagement with either U-notch, 22a or 22b, hence the locator pin 23 is in a slightly risen-up position but held pressing against the face of the holding plate 17 by the resilience of the locator 24, which is made of spring metal material. As shown in FIG. 4, the locator pin 23 is configured in the form of a cone. When the turret 3 is rotated away from one picture-taking position the cone surface of the locator pin 23 causes the pin to rise and finally disengage from the the U-notch. When the turret 3 is rotated into the other picture-taking position, because of the resilience in the locator 24 the locator pin 23 drops into the other U-notch, so defining the alternate position of the turret 3.

Provision is also made to inhibit shutter release whenever the turret 3 is out of proper position. FIGS. 7a and 7b show a shutter and aperture mechanism for the camera 1 when the camera is in normal mode. The whole shutter mechanism is mounted in a baseplate 57. The actuation arm 35 of the first lever 30 (See also FIG. 3a) and the aperture-control member 44 are mounted on the internal face of the front cover 2, as had been described. The dotted circles show the normal lens 4, the telephoto lens 5 and the holding plate 17 of the turret 3. Other components have been deleted for the sake of clarity.

In FIG. 7a, a shutter blade 58 is pivoted by an axle 59 and is biased anti-clockwise by a torsion spring 61 such that the rim of the shutter blade 58 is in abutment with a stopper pin 60. Under such conditions the shutter is closed because the shutter blade 58 obstructs the optical path of the camera by covering a shutter hole 87 formed on the baseplate 57.

A shutter actuation lever 63 is pivoted by an axle 64 and is always biased anti-clockwise by means of a spring 65. However, the shutter actuation lever 63 is held in the position shown in FIG. 7a because of the engagement of its cocking part 71 with a cocking part 77 of a shutter release lever 72. The latter element is pivoted by an axle 73, and is biased anti-clockwise by means of a spring 74. The shutter actuation lever 63 carries a striking member 66 which is fastened to the shutter actuation lever 63 by means of a boss 67 and a screw 68. The shutter actuation lever further has a lug part 69 and a tab 70 whose functions will be described later. The shutter release lever carries an extension arm 75 by means of two screws 76. The free end of the extension arm 75 is in abutment with a lever arm 81 of an aperture plate 78 pivoted by an axle 79 and biased anti-clockwise by a spring 80. The aperture plate 78 has an armature part 82 which is in contact with the anvil of a solenoid core 84 of an electrical solenoid 83. The latter is mounted to the baseplate 57 by a screw 85. The aperture plate 78 further has a hole 86 which is to be used as an aperture reducing stop when a picture is taken in normal mode under high ambient lighting condition.

FIG. 7a shows the mechanism in the cocked state wherein the tension is spring 74 urges the extension arm 75 to move the aperture plate 78 clockwise, placing the armature part 82 in contact with the anvil of the solenoid core 84.

The functions of the solenoid 83 and the aperture plate 78 will next be discussed. When the subject is illuminated by an ambient lighting higher than a critical level, the solenoid 83 is not energized, whereas when the ambient lighting is lower than the critical level, the solenoid 83 is energized by photosensor control means (not shown). In the former case, a small aperture should be used in order to obtain proper exposure of the film. This is achieved by releasing the aperture plate 78 so that the small-aperture hole 86 goes into the optical path (imaging path) of the camera. In the latter case, a large aperture should be used in order to obtain proper exposure of the film. This is achieved by energizing the solenoid 83 to attract the armature part 82 so that the aperture plate 78 remains held in the position shown in FIG. 7a. The small-aperture hole 86 is thus kept away from the optical path of the camera.

FIGS. 7a and 7b also show the collar part (in dotted circle) 27 urging the actuation arm 35, which in turn urges and holds the aperture-control member 44 in the position shown. Under such conditions the aperture-control member 44 does not obstruct the anti-clockwise rotation of the aperture plate 78 when the latter is released.

FIG. 7b shows the shutter and aperture mechanism as the shutter is released in the normal mode. The shutter release lever 72 is rotated clockwise by means of the depression of a shutter release button (not shown), so that the cocking parts 71 and 77 disengage with each other. The shutter actuation lever 63 is then released to rotate anti-clockwise at high speed because of the tension in spring 65. The lug part 69 hits the striking part 62 of the shutter blade 58 so that the latter is quickly flipped open, thereafter to return to its closed position because of the biasing spring 61. During the shutter release operation, and before the shutter starts to open, the aperture plate 78 is released (under low ambient lighting condition) so that the small-aperture hole 86 comes into the optical path of the camera. As a result, the picture is taken with a small aperture in normal mode. Shutter re-cocking is done by a clockwise rotation of the shutter actuation lever 63 and is not further described herein, since it is not related to the present invention.

If the ambient lighting condition is high, although the action on the lever arm 81 by the extension arm 75 is released during shutter release operation, the small-aperture hole 86 remains away from the optical path because the aperture plate 78 is attracted to stay in the position shown in FIG. 7a by the energization of the solenoid 83.

FIGS. 8a and 8b show the shutter and aperture mechanism when the camera is in telephoto mode. The telephoto lens 5 (shown in dotted circle) is in the optical path of the camera. The collar part 27 us not acting on the actuation arm 35, and thus in turn does not act upon the aperture-control member 44. The latter swings into the position shown by the spring 47 (See also FIG. 3a), and because of the abutment of the second lever 37 with the side wall 56 of the viewfinder housing as previously described. Under such conditions, the lug part 48 of the aperture-control member 44 comes into the position such that anti-clockwise rotation of the aperture plate 78 is inhibited if the latter is released. As a result, when the shutter is released as shown in FIG. 8b, the small-aperture hole 86 remains away from the optical path of the camera. Thus, the small-aperture, which cannot provide proper exposure in telephoto mode because of the inherently high focal ratio (f/9) of the telephoto lens, is never used in this mode.

FIG. 9 shows the same shutter and aperture mechanism but when the turret 3 is rotated half-way. The downward displacements (as viewed in FIG. 4) of the locator pin 23 and also the locator 24 occur when the locator pin 23 becomes disengaged with one of the U-notches 22a or 22b. As a result, the shutter release inhibitor 26 is also brought to displace downward. FIGS. 10a and 10b show section views of the relation between the inhibitor 26 and the tab 70 on the shutter actuation lever 63 when either picture-taking lens is in the optical path, and when the turret 3 is rotated half way, respectively. In FIG. 10a, the inhibitor 26 does not obstruct to the anti-clockwise rotation of the shutter actuation lever 63, and therefore shutter release can always be effected. In FIG. 10b, the downward displacement of the inhibitor 26 forces against the tab 70 so that the shutter actuation lever 63 is urged clockwise by a very small angle (See FIG. 9). Thus, shutter release is inhibited even though the shutter release button is depressed causing release of the engagement between the cocking parts 71 and 77. Hence, if neither picture-taking lens is in the optical path of the camera, shutter release is inhibited.

Thus, a variety of features have been combined in a disc camera to uncorporate the improved optical imaging of multiple on-board objective lenses with an automatic viewfinder actuation system presenting field framing marks appropriate to the lens in use. The use of a turret mount not only allows the use of completely independent lenses, but efficiently utilizes what would otherwise be underutilized space on both faces of the front wall of the camera. The shutter inhibiting system prevents accidental loss of a frame arising from an improperly positioned lens.

Finally, it should be evident that the suppressed-image viewfinder system described herein may equally well be applied to a great variety of multi-lens cameras, including motion-picture cameras.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out the invention, but that the invention will include all embodiments falling within the scope of the appended claims.

I claim:

1. In a camera having movable lens mounting means operable to a plurality of positions for interposing different picture-taking lenses into the imaging path of said camera to provide a plurality of different image fields, said camera further having a fixed viewing-angle viewfinder independent of said picture-taking lenses for providing an image of the scene to be photographed, the improvement wherein: said viewfinder has associated therewith means for providing a set of framing mark patterns, said set of patterns corresponding to the scene angles of said plurality of lenses, means for simultaneously providing images of all of said framing mark patterns superimposed upon the image of the scene presented by said viewfinder, and pattern suppressing means including a movable one-piece opaque mask member having transparent aperture means therein and being movably responsive to the position of said lens mounting means for interposably suppressing all of said framing mark pattern images except for that image corresponding to the picture-taking lens currently interposed in said imaging path, and wherein said movable lens mounting means includes a rotatable lens-carrying turret means, and said member is coupled to said turret means to be reciprocatingly actuated by the rotation thereof.

2. The camera of claim 1 wherein said camera includes a housing having relatively closely spaced major front and rear faces, and is adapted to receive a generally planar disc film cassette disposed therewithin and generally parallel to said major faces, and wherein said turret means is mounted to said front major face with the axis of rotation of said turret generally perpendicular thereto.

3. In a camera having movable lens mounting means operable to a plurality of positions for interposing different picture-taking lenses into the imaging path of said camera to provide a plurality of different image fields, said camera further having a fixed viewing-angle viewfinder independent of said picture-taking lenses for providing an image of the scene to be photographed, the improvement wherein: said viewfinder has associated therewith means for providing a set of framing mark patterns, said set of patterns corresponding to the scene angles of said plurality of lenses, means for simultaneously providing images of all of said framing mark patterns superimposed upon the image of the scene presented by said viewfinder, and pattern suppressing means including a movable one-piece opaque mask member having transparent aperture means therein and being movably responsive to the position of said lens mounting means for interposably suppressing all of said framing mark pattern images except for that image corresponding to the picture-taking lens currently interposed in said imaging path, and wherein said means for producing said framing mark patterns includes a pattern plate configured with markings constituting said set of framing mark patterns, said mask member is disposed parallel to and confronting said pattern plate and movable generally parallel with respect thereto, said member having a pattern of transparent apertures therein configured and disposed to display each of said framing mark patterns selectively as said member is moved through various positions thereof, said member being coupled to said lens mounting means to interpose only the aperture pattern displaying the framing mark pattern corresponding to the scene angle of the picture-taking lens currently interposed in said imaging path, said viewfinder includes an objective lens and eyepiece lens disposed along an optic axis of said view finder, said means for providing a superimposed image includes a beam splitter interposed between said objective and eyepiece lenses on said optic axis and reflecting the framining pattern produced by said pattern plate and said member into the field of view of said eyepiece, said pattern plate is generally opaque and has said framing mark patterns configured in the form of transparent regions, said plate being disposed to be illuminated by ambient light to produce said framing mark patterns as bright-line images, and wherein said member is disposed between said plate and said beam splitter, and wherein said camera includes a housing having relatively closely spaced major front and rear faces, and is adapted to receive a generally planar disc film cassette disposed therewithin and generally parallel to said major faces, said movable lens mounting means includes a rotatable lens-carrying turret means mounted to said front major face with the axis of rotation of said turret generally perpendicular thereto, said member is coupled to said turret means to be reciprocatingly actuated by the rotation thereof, and wherein said each of said framing mark patterns is configured in the form of rectangle-defining short line segments, said line segments of each said framing mark pattern and said member apertures being disposed so that all of said framing mark patterns may be selectively displayed by movement of said member over a distance less than the major dimension of the largest of said framing mark patterns.

4. In a disc camera having a housing with relatively closely spaced major front and rear faces and adapted to receive therein a generally planar disc film cassette disposed parallel to said major faces, said camera including a first picture-taking lens mounted on said major front face and means for rotating said film disc to advance successive regions thereof into a framing area for exposure to image-forming light produced by said first picture-taking lens, the improvement comprising: support means for pivotally mounting said first lens for rotation about an axis generally perpendicular to said housing front face and having at least two stable positions of adjustment; at least one additional picture-taking lens having a different imaging field than said first lens and carried by said support means, said lenses being positioned on such support means to form in conjunction therewith lens turret means, so that by rotation of said support means into each of said stable positions a selected picture-taking lens is placed in an imaging position in alignment with respect to said framing area; a separate viewfinder independent of said picture taking lenses; viewfinder field defining means for providing in said viewfinder a selection of viewing fields corresponding to the imaging fields of said picture taking lenses; adjusting means responsive to the position of said support means for adjusting said viewfinder field defining means so as to provide a viewing field indication corresponding to the imaging field of the picture-taking lens currently interposed in said imaging path.

5. The camera of claim 4 wherein said field-defining means of said viewfinder includes means for providing a set of framing mark patterns, said set of patterns corresponding to the scene angles of said plurality of lenses, and means for simultaneously providing images of all of said framing mark patterns superimposed upon the image of the scene presented by said viewfinder, and said adjusting means includes means responsive to the position of said lens mounting means for suppressing all of said framing mark pattern images except for that framing mark pattern image corresponding to the picture-taking lens currently interposed in said imaging path.

6. The camera of claim 5 wherein said means for producing said framing mark patterns includes a pattern plate configured with markings constituting said set of framing mark patterns, and said means for suppressing said patterns included an opaque one-piece member disposed parallel to and confronting said pattern plate and movable generally parallel with respect thereto, said member having transparent apertures therein configured to selectively display each of said patterns selectively as said member is moved through various positions thereof, said member being coupled to said lens mounting means to slidingly interpose the aperture pattern displaying only the framing mark pattern corresponding to that picture-taking lens currently interposed in said imaging path.

7. The camera of claim 6 wherein said viewfinder includes an objective lens and an eyepiece lens disposed along an optic axis of said viewfinder, and said means for providing a superimposed image include a beam splitter interposed between said objective and eyepiece lenses on said optic axis and reflecting the framing pattern produced by said pattern plate and said member into the field of view of said eyepiece 8. The camera of claim 7 wherein said pattern plate is generally opaque and has said framing mark patterns configured in the form of transparent regions, said pattern plate being disposed to be illuminated be ambient light to produce said framing mark patterns as bright-line images, and wherein said member is disposed between said pattern plate and said beam splitter.

9. The camera of claim 6 wherein said each of said framing mark patterns is in the form of rectangle-defining short line segments, said line segments of each said framing mark pattern and said members apertures being disposed so that all of said framing mark patterns may be selectively displayed by movement of said member over a distance less than the major dimension of the largest of said framing mark patterns.

10. The camera of claim 5 wherein said member is coupled to said turret means to be reciprocatingly actuated by the rotation thereof.

11. The camera of claims 3 or 4 wherein said camera includes a shutter release member operable from a first or initial position to a second or final position to cause said shutter to be actuated through a film-exposing cycle, and means responsive to the position of said lens mounting means to prevent actuation of said shutter release member from said initial to said final position unless one of said picture-taking lenses is positioned for proper imaging.

* * * * *